(12) United States Patent
Günther

(10) Patent No.: US 6,446,201 B1
(45) Date of Patent: Sep. 3, 2002

(54) METHOD AND SYSTEM OF SENDING RESET SIGNALS ONLY TO SLAVES REQUIRING REINITIALIZATION BY A BUS MASTER

(75) Inventor: Thomas Günther, Langenhagen (DE)

(73) Assignee: Hartmann & Braun GmbH & Co. KG, Eschborn (DE)

( * ) Notice: Subject to any disclaimer, the term of this patent is extended or adjusted under 35 U.S.C. 154(b) by 0 days.

(21) Appl. No.: 09/395,450

(22) Filed: Sep. 14, 1999

(30) Foreign Application Priority Data

Sep. 17, 1998 (DE) .......................... 198 42 593

(51) Int. Cl.[7] .............................. G06F 9/00; G06F 1/22; G06F 13/00
(52) U.S. Cl. ............................................. 713/1; 714/2
(58) Field of Search ............................ 713/2, 1; 714/2, 714/3

(56) References Cited

U.S. PATENT DOCUMENTS

| | | | | |
|---|---|---|---|---|
| 4,358,823 A | * | 11/1982 | McDonald et al. | ........... 714/11 |
| 4,608,631 A | * | 8/1986 | Stiffler | ......................... 710/113 |
| 4,634,110 A | * | 1/1987 | Julich et al. | .................. 714/11 |
| 5,928,359 A | * | 7/1999 | Lee | ............................... 713/1 |
| 5,996,038 A | * | 11/1999 | Looi et al. | ................... 710/129 |
| 6,145,041 A | * | 11/2000 | Chambers | .................... 710/110 |

FOREIGN PATENT DOCUMENTS

| | | | | |
|---|---|---|---|---|
| JP | 03187772 A | * | 8/1991 | ............ B41J/29/38 |
| JP | 06224923 A | * | 8/1994 | ........... G06F/13/00 |

* cited by examiner

Primary Examiner—Thomas Lee
Assistant Examiner—James K. Trujillo
(74) Attorney, Agent, or Firm—Michael M. Rickin

(57) ABSTRACT

A method and system for operating a bus master on a field bus on the basis of the master/slave principle in the event of a fault. The field bus has at least one slave connected to it and the bus master runs a separate state table for each connected slave. The state table stores the operating state of each individual slave and each state table is deleted when initialization takes place for the first time. In the event of a fault, the bus master is reinitialized such that a check is run to ascertain whether full initialization has taken place for each connected slave as assumed, and, if it has, the content of each state table is retained in unmodified form, and, if it has not, the state table for the affected slave is deleted and the bootstrap initialization is imposed.

17 Claims, 3 Drawing Sheets

METHOD AND SYSTEM OF SENDING RESET SIGNALS ONLY TO SLAVES REQUIRING REINITIALIZATION BY A BUS MASTER

FIELD OF THE INVENTION

This invention relates to a method of operating a bus master on a field bus on the basis of the master/slave principle and more particularly to the operation of such a bus in the event of a fault.

DESCRIPTION OF THE PRIOR ART

Field buses based on the master/slave principle are used for communication between automated systems and field devices for controlling an industrial process. A number of such field buses have been standardized to allow devices made by different manufacturers to communicate with one another. One protocol for operating such a bus is known as the PROFIBUS™ protocol.

In a field bus based on the master/slave principle, a bus master is allocated at least one slave, but usually a number of slaves. When such a field bus is initialized, the bus master attempts to contact each of these slaves on the field bus by means of cyclic inquiry. Each slave contacted in this way is initialized and parameterized, so that it is then possible for data interchange with the bus master to start.

During this initialization of the field bus, all the outputs of all the slaves are firstly reset, as in the PROFIBUS™ protocol. For safety reasons, this procedure is stipulated in Standard EN 50170.

If during continuous operation a fault occurs in the bus master that imposes reinitialization of the field bus, the preinitialized outputs of the slaves are reset anyway. This resetting results in equipment and devices connected to these outputs adopting undesirable operating states which cause the controlled industrial process to come to a standstill.

For safety reasons, the slaves are themselves designed to reset their outputs automatically after a predetermined time, known as the communication-free time, has elapsed with no communication. This procedure also causes the controlled industrial process to come to a standstill.

The present invention provides a method of operating a bus master on a field bus based on the master/slave principle, which, in the event of a fault, makes it possible to reinitialize the bus master within a predefined time, to start communication between the bus master and the slaves again, and in so doing to prevent the preinitialized outputs of the connected slaves from being reset.

SUMMARY OF THE INVENTION

A method of operating a bus master on a field bus in the event of a fault. The field bus has at least one slave connected to it. The bus master runs a separate state table for each connected slave, which stores the operating state of each connected slave. Each state table is deleted when initialization takes place for the first time. The method has the steps of:

a. assuming upon the fault event that full bootstrap initialization has taken place for each connected slave; and b. reinitializing upon the fault event the bus master such that a check is run to ascertain whether full bootstrap initialization has taken place for each connected slave, and, if it has, the content of each state table is retained in unmodified form, and, if it has not, the state table for the slave that was not fully initialized is deleted and bootstrap initialization is imposed on the not fully initialized slave.

A method for operating a bus master on a field bus. The bus master has one or more slaves connected to it and the field bus. The method comprises:

a. assuming upon the occurrence of a fault that full bootstrap initialization has taken place for each of the one or more slaves;

b. reinitializing the bus master upon the fault occurrence such that a check is run to ascertain whether full bootstrap initialization has taken place for each of the one or more slaves;

c. retaining the content of a state table in the bus master for each of the one or more slaves for which full bootstrap initialization has taken place; and d. deleting the state table content for each of the one or more slaves for which full bootstrap initialization has not taken place and imposing full bootstrap initialization on the not fully initialized slaves.

A system that has:

a. a bus master;

b. one or more slaves, the bus master having a state table having contents for each of the one or more slaves;

c. a field bus connecting the one or more slaves to the bus master;

the bus master assuming that upon the occurrence of a fault full bootstrap initialization has taken place for each of the one or more slaves;

the bus master reinitialized upon the fault occurrence such that a check is run to ascertain whether full bootstrap initialization has taken place for each of the one or more slaves;

the bus master retaining the state table contents for each of the one or more slaves for which full bootstrap initialization has taken place; and the bus master deleting the state table contents for each of the one or more slaves for which full bootstrap initialization has not taken place and imposing full bootstrap initialization on the not fully initialized slaves.

DESCRIPTION OF THE PREFERRED EMBODIMENT(s)

Figure 1:
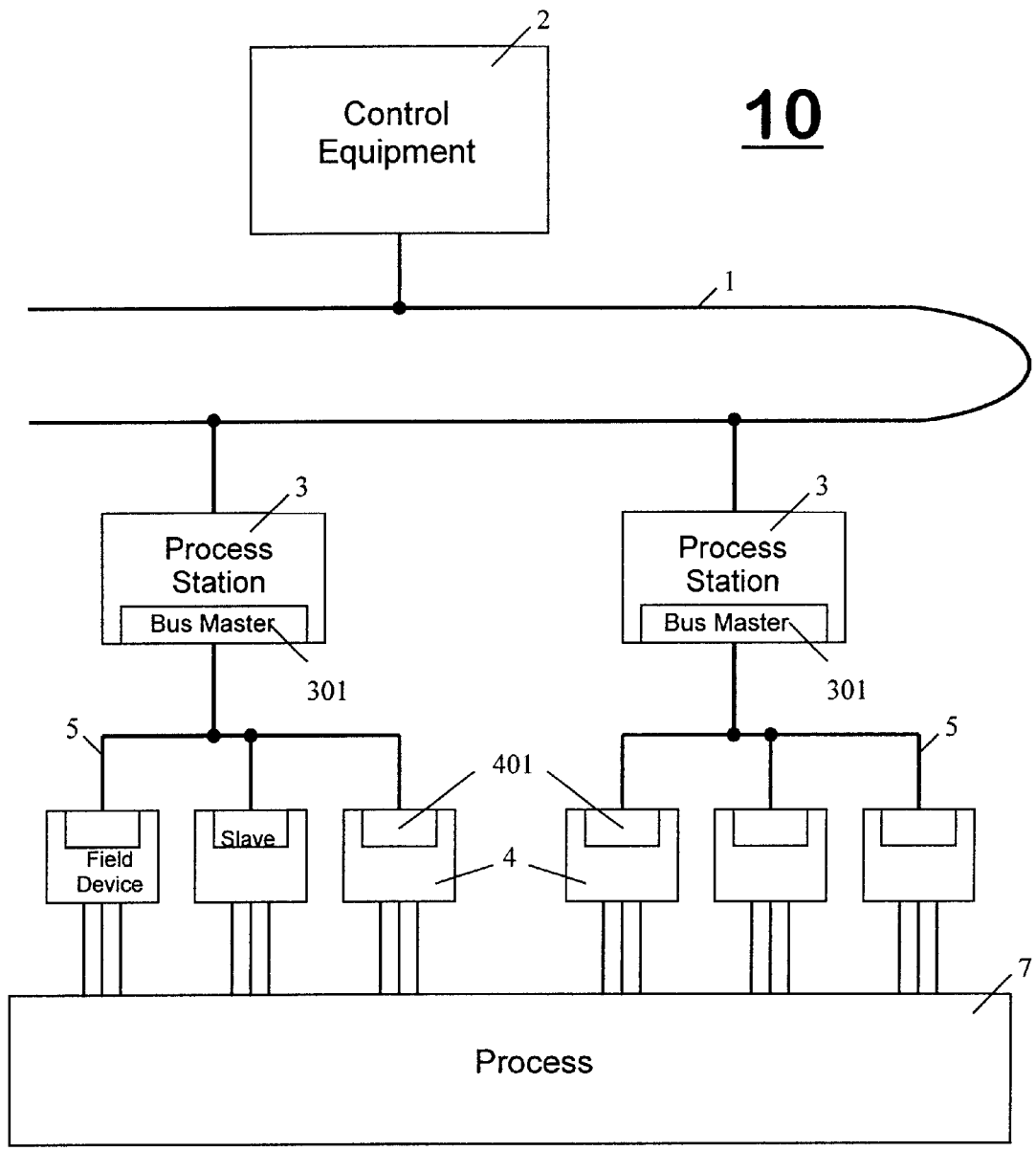
FIG. 1 shows a basic diagram of an automated system.

The automated system 10 shown in FIG. 1 has a system bus 1 to which at least operating, observation and configuration means, abbreviated to control equipment 2 below, and process stations 3 are connected. The control equipment 2 is used to supply the process stations 3 with the applications corresponding to the automated task, the applications' code and associated parameters being transmitted to the individual process stations 3.

Each of the process stations 3 is allocated at least one field device 4 which is operatively connected in an appropriate manner to the process 7 that is to be automated. A field bus 5 is provided for communication between the process stations 3 and the field devices 4. This field bus 5 is designed according to the PROFIBUS™ protocol standard EN 50170. The PROFIBUS™ protocol is a master/slave bus protocol. This means that the bus master determines the timing and content of communication on the bus.

For communication through the field bus 5, the process station 3 is equipped with a bus master 301, and each field device 4 is equipped with a slave 401. Each bus master 301 and each slave 401 comprises a dedicated computational device with separate execution and processing routines. Each slave 401 is preconfigured individually. Information about the type and features as well as identifying characteristics of the slave 401 and of the associated field device 4 are preset in this case.

At bootstrap initialization, the bus master 301 runs through a number of states. When the system is switched on, starting from the state in which there is no action or communication, the master configuration of the bus master 301 is first loaded. During this procedure, the bus master 301 is informed of the individual presets of each slave 401. The connection to the slaves 401 is then established, exclusively zero data being transferred in the output direction. After communication has been established successfully, application data is interchanged with the slaves 401.

For each slave 401, the bus master 301 runs a separate state table, the so-called slave handler, which runs through a number of states for each slave 401 at bootstrap initialization. In this context, the slave handler is first started without any configuration. Subsequently, the slave 401 is addressed on the field bus 5. During this procedure, all the output data is set to zero. After the slave 401 has been detected, it is supplied with configured parameters, the outputs remaining at zero. The configuration of the slave 401 is then loaded and compared with the expected individual presets, the outputs continuing to remain at zero. After this, the diagnostic data of the slave 401 is read, the outputs continuing to remain at zero. In so far as configuration and parameterization are completed without error, cyclic data interchange between the bus master 301 and the respective slave 401 is started, the outputs of the slave 401 being set on the basis of the application data.

During correct operation, all the slaves 401 are in the data interchange state. If a fault occurs in the bus master 301, necessitating a restart, the method of the present invention first assumes that each connected slave 401 is fully initialized. The bus master 301 is then reinitialized such that a check is run to ascertain whether full initialization has taken place for each connected slave (401) as assumed. For each slave 401 that has actually been fully initialized, data interchange between the bus master 301 and this slave 401 is continued immediately.

In the absence of the present invention every slave 401 would after the occurrence of a fault reset its output for safety reasons after the passage of the predefined maximum communication-free time. The present invention prevents the resetting of the outputs of those slaves 401 that during the maximum communication-free time continue established communication requested by the bus master 301 that was reinitialized upon the occurrence of the fault. This prevention of the resetting of those slaves 401 that continue established communication during the maximum communication-free time avoids undesirable operating states in the controlled industrial process 7.

For each slave 401 that has not been fully initialized, the state table is deleted and hence the bootstrap initialization described above is imposed. This case arises whenever the fault imposing reinitialization occurs during bootstrap initialization or during a reconfiguration phase. As the relevant slaves 401 were in a different state than the data interchange state at the instant of the fault, the imposed bootstrap initialization advantageously avoids any change of state relevant to the process 7.

Figure 2:
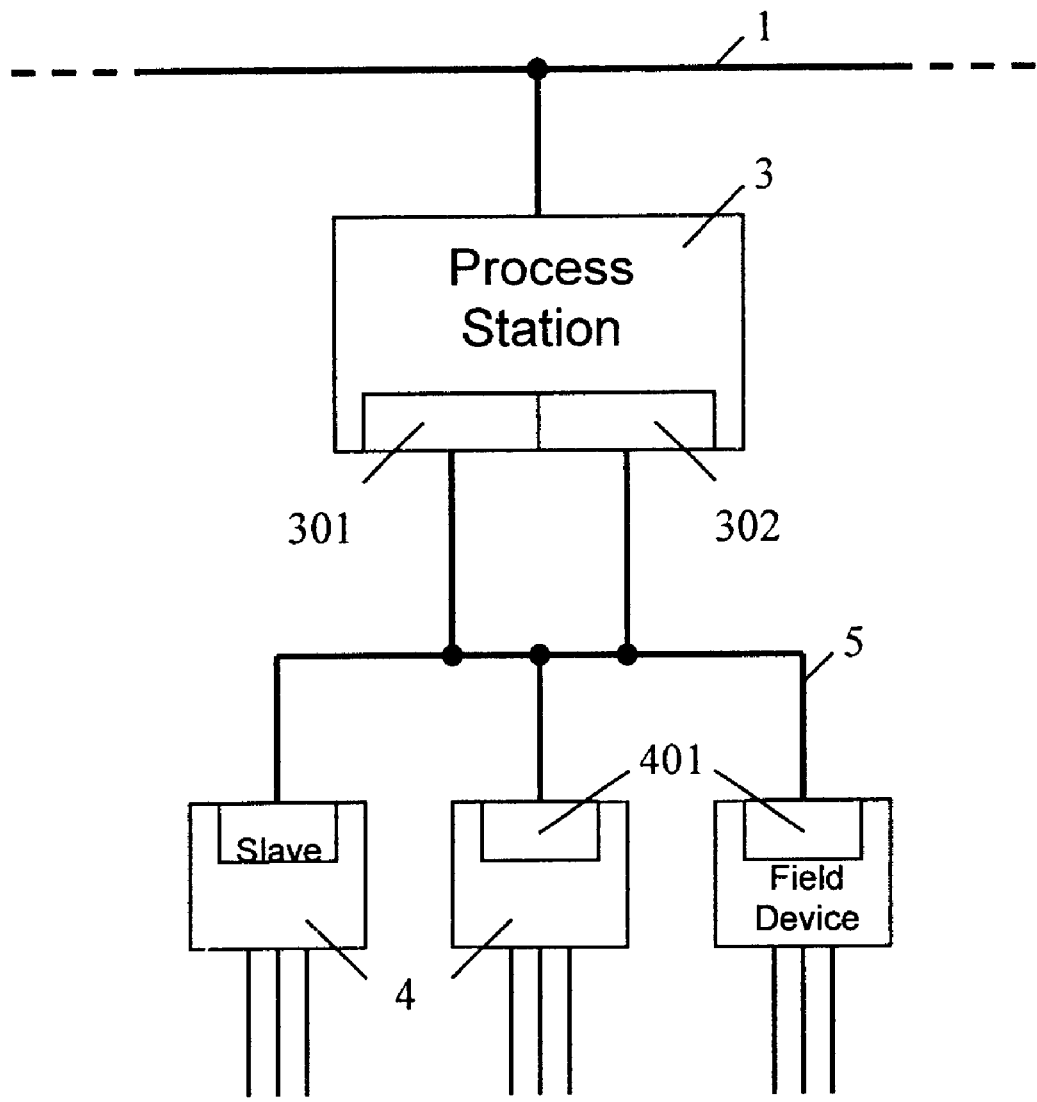
FIG. 2 shows a diagram of a process station having a redundant bus master.
Figure 3:
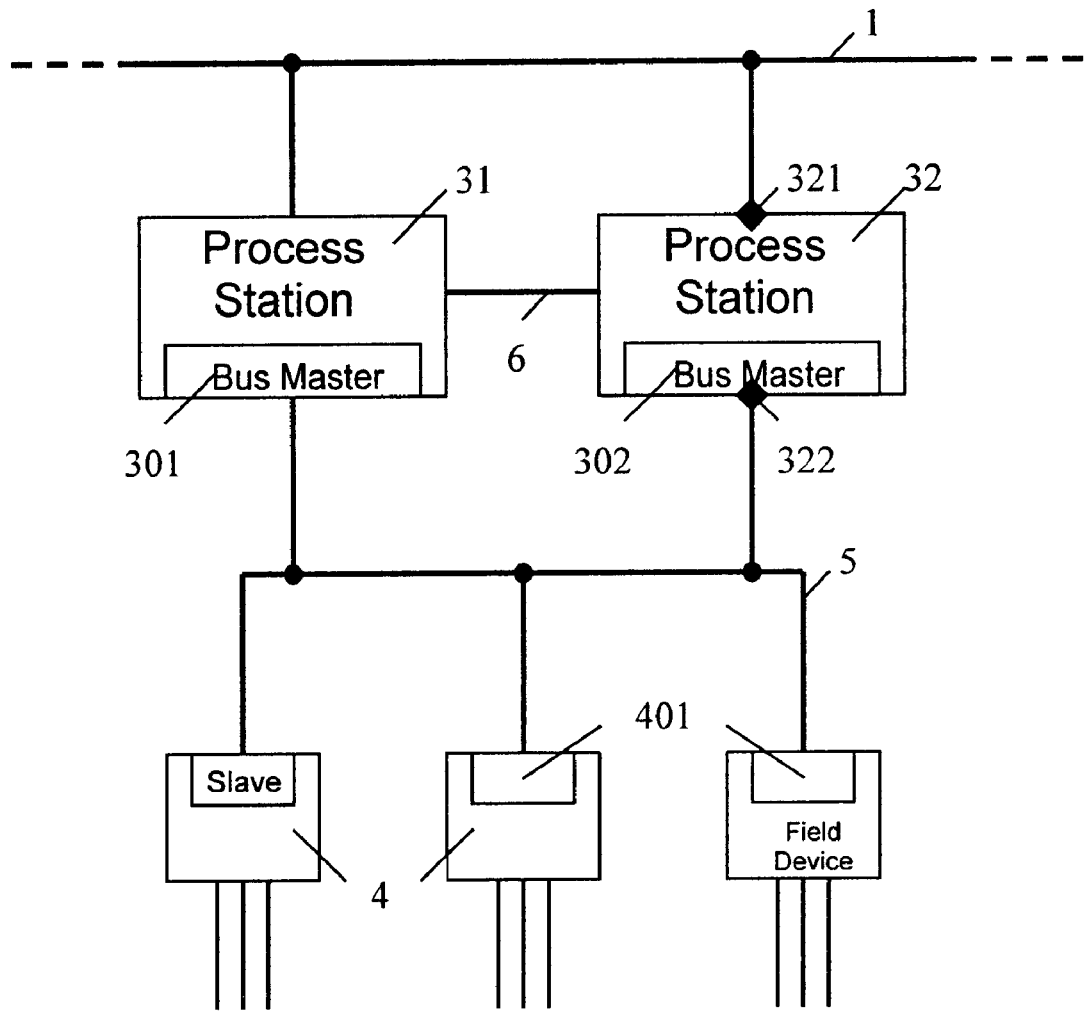
FIG. 3 shows a diagram of redundant process stations having a separate bus master.

In an advantageous refinement of the invention, the method of the present invention can also be applied to bus master redundancy. Bus master redundancy is not provided as such in accordance with the PROFIBUS™ system standard EN 50170. In order nevertheless to increase the availability of a PROFIBUS™ system, at least two bus masters 301 and 302 are provided which, as shown in FIG. 2, are installed in the same process station 3 or, as shown in FIG. 3, are each allocated to a separate process station 31 and 32. The description that follows refers to two bus masters 301 and 302 allocated to separate process stations 31 and 32, as illustrated in FIG. 3.

The two process stations 31 and 32 are coupled to one another through a direct connection 6 and are configured identically. This means, specifically, that the two process stations 31 and 32 are loaded with the same applications having an identical code and identical parameters. Furthermore, the same processes are started on the two process stations 31 and 32. However, only the process station 31 is activated, while the other process station 32 is switched to the passive mode. In this context, it may be expedient to execute the started processes exclusively on the active process station 31. The direct connection 6 is used to transfer data from the active process station 31 to the passive process station 32. This includes the received application data that is to be output and the configuration data of the associated slaves 401.

The interface 321 between the process station 32 that has been switched to the passive mode and the system bus 1, and the interface 322 between the bus master 302 and the field bus 5, are connected physically but switched to passive mode logically.

During correct operation, all of the slaves 401 are in the data interchange state. If a fault occurs in the active bus master 301, the previously passive bus master 302 is activated and the previously active bus master 301 is switched to the passive mode. When the previously passive bus master 302 is activated, it is first assumed that each connected slave 401 is fully initialized. In this context, the previously passive bus master 302 is initialized such that a check is run to ascertain whether full initialization has taken place for each connected slave 401 as assumed. For each slave 401 that has actually been fully initialized, data interchange between the bus master 301 and the fully initialized slave 401 is continued immediately.

In the absence of the present invention every slave 401 would after the occurrence of a fault reset its output for safety reasons after the passage of the predefined maximum communication-free time. The present invention prevents the resetting of the outputs of those slaves 401 that during the maximum communication-free time continue established communication requested by the bus master 302 that was activated upon the occurrence of the fault. This prevention of the resetting of the slaves 401 that continue established communication during the maximum communication-free time avoids undesirable operating states in the controlled industrial process 7.

For each slave 401 that has not been fully initialized, the state table is deleted and hence the bootstrap initialization described above is imposed. This case arises whenever the fault imposing reinitialization occurs during bootstrap initialization or during a reconfiguration phase. As the relevant slaves 401 were in a different state than the data interchange state at the instant of the fault, the imposed bootstrap initialization advantageously avoids any change of state relevant to the process 7.

For communication purposes, the activated bus master 302 adopts the bus address of the malfunctioning bus master 301. Consequently, this method is completely transparent for the connected slaves 401. Advantageously, this means that all the available slaves 401 can continue to be operated without limitation.

A further advantage is that it is possible to dispense with state adjustment between the redundant bus masters 301 and 302. The bus master 301 taking over is synchronized in the state of the slaves 401 that are allocated to it.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method of operating a bus master on a field bus in the event of a fault, said field bus having at least one slave connected to it and said bus master running a separate state table for each connected slave, which stores the operating state of each connected slave, each state table being deleted when initialization takes place for the first time, said method comprising the steps of:
   a. assuming upon said fault event that full bootstrap initialization has taken place for each connected slave; and
   b. reinitializing upon said fault event said bus master such that a check is run to ascertain whether full bootstrap initialization has taken place for each connected slave, and, if it has, the content of each state table is retained in unmodified form, and, if it has not, said state table for said slave that was not fully initialized is deleted and bootstrap initialization is imposed on said not fully initialized slave.

2. The method of claim 1, wherein there are redundant bus masters and all of said redundant bus masters are configured identically, said method further comprising the steps of:
   i. selecting one of said redundant bus masters as an active bus master to communicate with all of said slaves, all said other redundant bus masters being switched to a passive mode;
   ii. reinitializing one of said passive mode redundant bus masters upon a malfunction in said active bus master; and
   iii. switching said malfunctioning active bus master to said passive mode.

3. A method for operating a bus master on a field bus, said bus master having one or more slaves connected to it and said field bus, comprising:
   a. assuming upon the occurrence of a fault that full bootstrap initialization has taken place for each of said one or more slaves;
   b. reinitializing said bus master upon said fault occurrence such that a check is run to ascertain-whether full bootstrap initialization has taken place for each of said one or more slaves;
   c. retaining the content of a state table in said bus master for each of said one or more slaves for which full bootstrap initialization has taken place; and
   d. deleting said state table content for each of said one or more slaves for which full bootstrap initialization has not taken place and imposing full bootstrap initialization on said not fully initialized slaves.

4. The method of claim 3 wherein there are redundant bus masters and all of said redundant bus masters are configured identically, said method further comprising:
   i. selecting one of said redundant bus masters as an active bus master to communicate with all of said one or more slaves, all said other redundant bus masters being switched to a passive mode;
   ii. reinitializing one of said passive mode redundant bus masters upon a malfunction in said active bus master; and
   iii. switching said malfunctioning active bus master to said passive mode.

5. A system comprising:
   a. a bus master;
   b. one or more slaves, said bus master having a state table having contents for each of said one or more slaves;
   c. a field bus connecting said one or more slaves to said bus master;
   said bus master assuming that upon the occurrence of a fault full boot strap initialization has taken place for each of said one or more slaves;
   said bus master reinitialized upon said fault occurrence such that a check is run to ascertain whether full bootstrap initialization has taken place for each of said one or more slaves;
   said bus master retaining said state table contents for each of said one or more slaves for which full bootstrap initialization has taken place; and
   said bus master deleting said state table contents for each of said one or more slaves for which full bootstrap initialization has not taken place and imposing full bootstrap initialization on said not fully initialized slaves.

6. The system of claim 5 further comprising one or more process stations each equipped with said bus master.

7. The system of claim 6 further comprising one or more field devices allocated to each of said one or more process stations, each of said one or more field devices equipped with an associated one of said one or more slaves.

8. The system of claim 7 wherein each of said one or more field devices are connected to a process.

9. The system of claim 8 wherein said process is an industrial process.

10. The system of claim 6 wherein each of said one or more process stations is connected by a system bus to control equipment.

11. The system of claim 5 further comprising redundant bus masters.

12. The system of claim 11 wherein each of said redundant bus masters are configured identically.

13. The system of claim 11 further comprising a process station and each of said redundant bus masters are installed in said process station.

14. The system of claim 11 further comprising one or more process stations, each of said redundant bus masters allocated to an associated one of said one or more process stations.

15. The system of claim 11 wherein one of said redundant bus masters is selected as an active bus master to communicate with all of said one or more slaves, all of said other redundant bus masters being switched to a passive mode.

16. The system of claim 15 wherein one of said passive mode redundant bus masters is reinitialized upon a malfunction in said active bus master.

17. The system of claim 16 wherein said malfunctioning active bus master is switched to said passive mode.

\* \* \* \* \*